United States Patent [19]
Schneider et al.

[11] Patent Number: 5,267,254
[45] Date of Patent: Nov. 30, 1993

[54] COLOR CENTER LASER WITH TRANSVERSE AUXILIARY ILLUMINATION

[75] Inventors: Irwin Schneider, Alexandria, Va.; Robert S. Afzal, Boston, Mass.

[73] Assignee: The United States of America as represented by the Secretary of the Navy, Washington, D.C.

[21] Appl. No.: 868,806

[22] Filed: Apr. 15, 1992

[51] Int. Cl.[5] .............................................. H01S 3/16
[52] U.S. Cl. ....................................... 372/42; 372/69
[58] Field of Search .................................. 372/42, 69

[56] References Cited

U.S. PATENT DOCUMENTS

| | | | |
|---|---|---|---|
| 4,208,638 | 6/1980 | Merritt | 331/94.5 G |
| 4,255,719 | 3/1981 | Bloom et al. | 331/94.5 F |
| 4,301,426 | 11/1981 | Schneider | 331/94.5 F |
| 4,519,082 | 5/1985 | Schneider | 372/42 |
| 4,638,484 | 1/1987 | Rand et al. | 372/42 |
| 4,839,009 | 6/1989 | Pollock et al. | 204/157.48 |
| 4,881,234 | 11/1989 | Foster et al. | 372/42 |
| 4,964,133 | 10/1990 | Pollock et al. | 372/42 |
| 4,990,322 | 2/1991 | Pollon et al. | 372/42 |

FOREIGN PATENT DOCUMENTS

WO86/03347 6/1986 World Int. Prop. O. .

OTHER PUBLICATIONS

*Output-spectrum sweep of a color-center laser*, F. V. Karpushko, N. A. Saskevich Inst. of Physics, Acad. of Sci. of Belorussian SSR, Minsk, Sov. Tech. Phys. Lett., vol. 6, No. 3, Mar. 1980.
Emission Characteristics of an LiF:F$_2$ Colour Centre Laser In The Visible, T. Kulinski, F. Kaczmarek, M. Ludwiczak, Z. Blaszczak, Optics Communications, vol. 35, No. 1, Oct. 1980.
Development of high power cw KCl:Li (F$_2^+$)$_A$ color center laser, Robert S. Afzal, Irwin Schneider, J. Appl. Phys. vol. 69, No. 8, Apr. 15, 1991.
*Color Center Laser Pumped By A FlashLamp-Pumped Dye Laser*, R. Beigang, Optics Communications, vol. 34, No. 2, Aug. 1980.

Primary Examiner—Léon Scott, Jr.
Attorney, Agent, or Firm—Thomas E. McDonnell; George Jameson

[57] ABSTRACT

A color center laser is provided with a crystal disposed within a longitudinally pumped cavity. Optics are provided to transversely excite the crystal. Both a circular lens and a cylindrical lens focus an auxiliary beam into the crystal of the color center laser to produce (F$_2^+$)$_A$ color centers for lasing. The cylindrical lens is used to focus the auxiliary beam to a narrow focal line. The circular lens is used to adjust the length of the focal line. By adjusting the length of the focal line, an entirety of the pump beam is used for excitation. The lenses thus collimate and focus the focal line to a length within an active volume in the crystal of the color center laser essentially equal to a length of the crystal.

18 Claims, 6 Drawing Sheets

PRIOR ART

*FIG. 1(a)*

PRIOR ART

*FIG. 1(b)*

PRIOR ART

*FIG. 1(c)*

PRIOR ART

*FIG. 1(d)*

PRIOR ART

COLOR CENTER LASER WITH TRANSVERSE AUXILIARY ILLUMINATION

BACKGROUND OF THE INVENTION

1. Field of the Invention

The present invention relates to a longitudinally pumped color center laser with transverse auxiliary illumination and, more particularly, relates to a color center laser with lenses to direct a transverse auxiliary beam to a focal line essentially equal to a length of a crystal of the color center laser.

2. Description of the Related Art

Figure 1A:
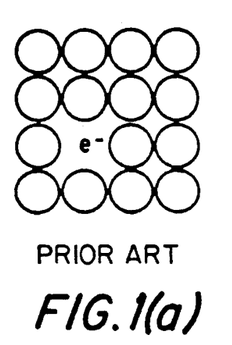
FIGS. 1(a) through 1(e) illustrate the crystal of various color centers in color center lasers.
Figure 1B:
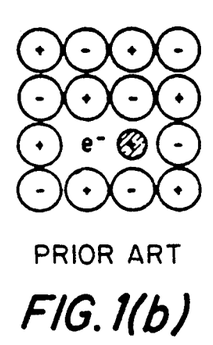
Figure 1C:
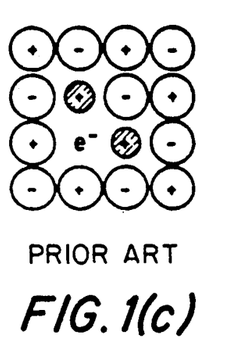
Figure 1D:
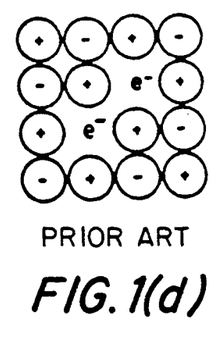
Figure 1E:
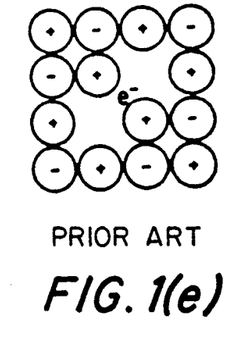

Color center lasers contain crystals having cubic lattice structures. The crystal, or color center material, is usually an alkali halide crystal containing defects consisting of halide ion vacancies, trapped electrons and often alkali-ion impurities. FIG. 1(a) illustrates the simplest such color center, an F center (from the German word "Farbe" for color). The F center has a single electron trapped by a halide-ion vacancy. Its principal absorption band, the F band, is due mostly to a single transition 18 in the visible spectrum broadened from a line to a band by the interaction of its electron with neighboring lattice ions. This visible absorption band, in an otherwise transparent material, lends coloration to the crystal. If one of its six contiguous alkali ions is replaced by an alkali-ion impurity (e.g., an Na$^+$ ion in a KCl crystal), the F center becomes an $F_A$ center with a structure shown in FIG. 1(b). If two of the contiguous alkali ions are alkali impurities, the F center is specified as an $F_B$ center, as illustrated in FIG. 1(c). FIG. 1(d) illustrates an $F_2$ center, being two F centers along a <110> direction, i.e., two electrons plus two neighboring anion vacancies. FIG. 1(e) illustrates an $F_2^+$ center being an electron trapped by two anion vacancies, i.e., a singly ionized pair of neighboring F centers. Finally, if the $F_x^+$ center is adjacent to a substitutional alkali impurity, e.g., Li$^+$ or Na$^+$ in a KCl crystal, it is called an $(F_2^+)_A$ center.

An important class of color center laser materials consists of alkali halide crystals using the emission of $(F_2^+)_A$ centers. These $(F_2^+)_A$ centers often can be created from $(F_2)_A$ centers by exposure of the crystal to visible or near-ultraviolet (NUV) light. Lasing can be obtained from these $(F_2^+)_A$ centers which are dynamically stabilized through trapping of $F_2$-center electrons by $F_A$ and $F_B$ centers. A technique for exposing these crystals to create $(F_2^+)_A$-color center lasers is disclosed in U.S. Pat. Nos. 4,301,426 and 4,519,082 by Irwin Schneider, which are specifically incorporated herein by reference. This class of color-center materials provides laser action which is efficient, capable of pulsed or continuous operation and is broadly tunable. For example, a color center laser using this class of materials is tunable from 1.6 to 1.9 microns ($\mu$m) in Na doped KCl and 2.0 to 2.5 microns in Li doped KCl. By including all known $(F_2^+)_A$ color center lasers, the range of tunability extends from 1.6 to 4.0 microns. However, one major drawback of previous $(F_2^+)_A$ lasers was that their output powers have never exceeded a few hundred milliwatts.

SUMMARY OF THE INVENTION

An object of the present invention is to provide a laser having an increased power by using a new optical setup.

Another object of the present invention is to provide a color center laser having roughly a three hundred percent increase in power over previously known $(F_2^+)_A$ color center lasers.

It is another object of the present invention to provide a color center laser wherein an entirety of the length of its crystal is transversely illuminated by the focal line of the auxiliary beam.

It is a further object of the present invention to provide a color center laser with lenses to focus an entirety of an auxiliary beam into an active volume of a crystal to a focal line of a length essentially equal to a length of the crystal.

It is still a further object of the present invention to provide a color center laser having a transverse auxiliary beam shaped and focussed by both circular and cylindrical lenses.

It is an additional further object of the present invention to provide a color center laser having a circular lens for collimating a transverse auxiliary beam and a cylindrical lens for focusing the collimated transverse auxiliary beam to a focal line of a length essentially equal to the length of an exemplary alkali halide crystal of the color center laser.

These and other objects are achieved by a color center laser having a color center material arranged lengthwise along an optical axis of the laser. An excitation source provides an auxiliary beam for transversely exposing the color center material. Both a cylindrical lens and a circular lens are located between the color center material and the excitation source. The cylindrical lens focuses the auxiliary beam on the color center material to a focal line having a narrow width. The circular lens collimates the auxiliary beam so that the length of the focal line is essentially equal to the length of the color center material. Therefore, an entirety of the energy of the auxiliary beam is used to form and sustain a population of $(F_2^+)_A$ centers in the active volume (lasing portion) of the color center material. Thus, besides providing optimum excitation in the color center material, little energy from the auxiliary beam misses the active volume of the color center material by being directed onto areas or surfaces other than that of the color center material.

The above-mentioned objects and other objects and features of the present invention will become apparent from the following description when read in conjunction with the accompanying drawings.

DETAILED DESCRIPTION OF THE PREFERRED EMBODIMENTS

Figure 2:
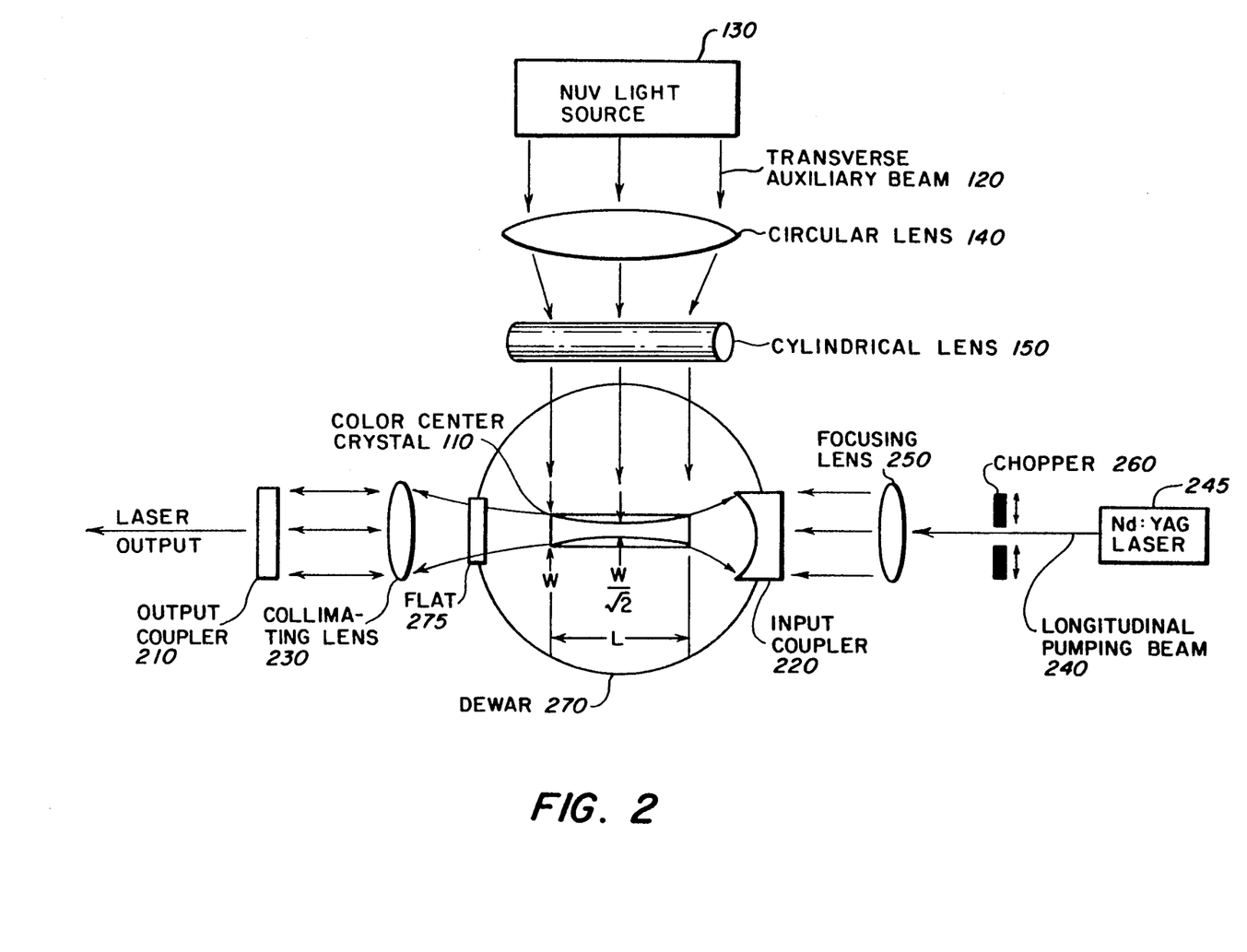
FIG. 2 illustrates a color center laser of the present invention with both longitudinal laser pumping and transverse illumination by an auxiliary beam, the auxiliary beam being focused by the optics of the color center laser of the present invention.

FIG. 2 schematically illustrates a color center crystal 110 transversely illuminated by an auxiliary beam 120 produced by a NUV light source 130. Both a circular lens 140 and a cylindrical lens 150 respectively collimate and focus the auxiliary beam into the color center crystal 110. More specifically, the circular lens 140 provides gentle focussing to the auxiliary beam in order to adjust the length of the focal line preferably to equal the length L of the color center crystal 110, while the cylindrical lens 150 focuses the auxiliary beam 120 into the color center crystal 110 in a focussed line. This line lies within the active region of the color center crystal 11 along the optical axis of the color center laser. The NUV light source 130 can be furnished by a 100 Watt mercury lamp, Oriel Model 8510-1, usually filtered using a $CuSO_4$ solution.

Lasing occurs between an input coupler 220 and an output coupler 210. The input coupler 220 preferably consists of an input mirror with a concave surface facing the color center crystal 110. This concave surface contains a dielectric coating for high reflectivity from 2.0 to 2.5 microns. The input coupler 220 preferably can be mounted with a micrometer adjustable bellows arrangement while providing a vacuum seal to a tail section of a Dewar 270.

The output coupler 210 is flat and has a surface facing the color center crystal with a preferably 70% reflective coating at about 2.1 microns. Other couplers can be used with reflective coatings varying from 99% to 70% (for 2.0 to about 2.5 microns). The surface of the output coupler 210, also facing the color center crystal 110, has high reflectivity for 1.3 microns to reflect most of the unabsorbed pumping beam 240 back to the color center crystal 110. The output surface of the output coupler 210 has an anti-reflective coating for 2.0 to 2.5 microns. The output coupler 210 preferably is located about 16 centimeters from a cavity collimating lens 230.

A cavity collimating lens 230 is placed between the output coupler 210 and the color center crystal 110. The collimating lens 230, input coupler 220 and output coupler 210 collectively create a cavity mode which has a narrow beam waist about midway between the collimating lens 230 and the input coupler 220, with a confocal parameter length about equal to the length of the color center crystal 110. The confocal parameter length is the distance measured along the cavity most suitable for pumping and transverse illumination. The collimating lens 230 is anti-reflective coated both for 1.3 microns and for 2.0 to 2.5 microns. As an alternative, the output coupler 210 and the collimating lens 230 can be replaced by a single concave output mirror. This mirror would have dielectric coatings similar to that of the output coupler 210.

As illustrated in FIG. 2, the narrowest portion of the beam waist has a width $W/\sqrt{2}$ when both ends of the color center crystal 110 have a width W. Furthermore, the length of the crystal L should be approximately equal to the confocal parameter of the cavity. The confocal parameter is defined as $\pi W^2/\lambda$, wherein $\lambda$ represents the wavelength of the lasing light. The optical cavity elements and cavity element separations are chosen so that the confocal parameter approximately equals the length of crystal L. It is possible, however, that the length of the crystal can be slightly different than this confocal parameter. The largest output powers are derived from the laser when both the circular lens 140 is adjusted so that the length of the focal line is equal to the length L of the color center crystal 110 and the cylindrical lens produces a focal width approximately equaling the width of the cavity beam waist.

The color center crystal 110 is generally rectangular in shape. The crystal 110 is placed in the cavity mode centered around the cavity beam waist. The auxiliary beam should then be focussed into the center of the color center crystal 110. Even though one transverse auxiliary beam is illustrated in FIG. 2, a plurality of transverse auxiliary beams incident to the crystal at different angles can be used.

The cavity output can be tuned by replacing the output coupler 210 with a Littrow mounted diffraction grating. As an example, a diffraction grating can be used which is blazed at 2.15 microns with 420 groves per mm to reflect about 90% of the light between 2.0 and 2.5 microns.

The color center laser is longitudinally pumped by using a laser pumping beam 240 via a steering and focusing lens system 250. The longitudinal pumping beam 240 can be provided by a Nd:YAG laser 245 operating preferably at wavelengths near 1.3 microns. This laser pump operates in an unpolarized, unapertured continuous wave (cw) mode. A 12 Watt Quantronix model 117 laser was used for tests. The color center crystal 110 preferably is a KCl:Li crystal centered at the cavity beam waist between the input coupler 220 and the collimating lens 230. The input coupler 220 preferably has a concave surface with a radius of curvature of 25 millimeters. The collimating lens 230 preferably is a calcium fluoride positive lens with a focal length of 5 centimeters. To achieve laser stability, the separation between the input mirror 220 and lens 230 was slightly greater than 75 mm, i.e., approximately the sum of the radius of curvature of the mirror 220 and the focal length of the lens 230. The width $W/\sqrt{2}$ of the beam waist at the narrowest portion is approximately 113 microns in diameter produced using all the above-mentioned cavity components having these preferred parameters including the input coupler 220 and the collimating lens 230.

A chopper 260 is provided to chop the longitudinal laser pump beam 240 with a 50% duty cycle. The chopper 260 reduces heating of the color center crystal 110 by the pump beam. The color center crystal 110 is preferably placed in the Dewar 270. The Dewar 270 keeps the color center crystal 110 in an evacuated state while it is at low temperatures.

A calcium fluoride flat 275 is a Dewar window located between the color center crystal 110 and the collimating lens 230. With slight modification, the collimating lens 230 can be used for the window in place of the calcium fluoride flat 275. The calcium fluoride flat 275, like the collimating lens 230, has an anti-reflective coating for wavelengths from 2.0 to 2.5 microns. The input coupler 220 preferably forms an input window to the Dewar 270. The input mirror 220, as discussed above, is preferably anti-reflective coated to transmit as much 1.3 microns pump light as possible. Furthermore, as discussed above, the collimating lens 230 is preferably anti-reflective coated both for 1.3 microns and for 2.0 to 2.5 microns.

Using the above-identified parameters, a $(F_2^+)_A$ laser yielding over 1.2 Watts cw power output is provided. This power increase is a significant improvement of approximately 300% over previously known $(F_2^+)_A$ color center lasers. This power increase is due largely to the focussing of the transverse auxiliary beam 120 using both a circular lens 140 and a cylindrical lens 150 so that the focal line has a length essentially equal to the length L of the color center crystal 110 and width equal to the cavity beam waist. This focussing essentially confines the auxiliary light to the beam waist of the cavity and to the length of the crystal in the confocal region of the cavity.

PREPARATION OF CRYSTALS

The color center crystal 110 was grown with as much lithium as possible so that the $F_A$ center will be the predominant electron trap. The samples were heavily colored by the additive coloration technique, to produce large stable $(F_2^+)_A$ concentrations. The samples were processed based on the following theoretical considerations.

Normally, additively colored crystals contain mostly F centers plus some $F_2$ centers. The initial concentrations of $F_2$ centers vary quadratically with F-center concentration. For undoped crystals, the excitation of F centers around room temperature with NUV light produces mobile anion vacancies which diffuse through the lattice, until they become trapped by other F centers and which form additional $F_2$ centers. This NUV light was provided from a 200 watt mercury lamp, Bausch and Lomb SP 200, filtered through a $CuSO_4$ solution and 7-54 Corning filter. This light is also absorbed by $F_2$ centers which diffuse through the lattice via repeated reorientations, until they are trapped by F centers forming $F_3$ centers. Because the latter are so stable, eventually almost all centers convert to $F_3$ centers.

In lithium-doped samples, isolated $Li^+$ ions compete with F centers as vacancy traps so that $F_A$ centers are also produced. Lithium $F_A$ centers are likewise extremely stable. In lightly to moderately colored samples (i.e., less than $10^{17}$ F centers per cubic centimeter), practically all F centers convert to $F_A$ centers and further aggregation ceases. Large $(F_2)_A$ concentrations therefore can only be produced in heavily colored samples where F centers compete more effectively with alkali impurities as vacancy traps. Some $F_2$ centers are always present immediately after coloration because of the statistical likelihood that $F_2$ centers exist as nearest neighbors. Additional $F_2$ centers are produced during aggregation because F centers are within short migrating distances of one another. As in undoped crystals, $F_2$ centers migrate via reorientations, producing some $F_3$ centers. But in the lithium-doped samples, the $F_2$ centers form mostly $(F_2)_A$ centers. The $(F_2)_A$ centers are optically stable because their $(F)_2$ component is pinned in the lattice next to the impurity ion.

$(F_2^+)_A$ centers are produced at low temperatures with NUV light in a photodynamic process in which $(F_2)_A$ center electrons are transferred to centers like the F center and $F_A$ center. The $F_A$ center is the preferred electron trap for $(F_2^+)_A$ center laser crystals since $F_A^-$ centers have weaker absorption in the 1.3 micron pump region. Under lasing conditions, this absorption slowly ionizes $F_A^-$ centers, causing bleaching of $(F_2^+)_A$ centers. $(F_2^+)_A$ populations can therefore only be sustained by simultaneous irradiation of the samples with a NUV auxiliary source.

Based on these theoretical considerations, the samples were prepared with as much lithium as possible so that the $F_A$ center will be the predominant electron trap.

The samples were also prepared so that they were heavily colored by the additive coloration technique to produce large stable $(F_2)_A$ center concentrations. About 1 mol % LiCl can be added to the KCl melt. High coloration densities were produced by coloring crystals in sealed, high pressure tubes. In these tubes, the coloration density equilibrates slowly and eventually exceeds desirable values. Therefore, the density required for optimum lasing were first determined experimentally. These densities are produced using various equivalent combinations of coloring temperature and coloring time. Factored into this coloring process is the fact that the coloration density also depends on $Li^+$ concentration. Even within the same boule, crystals from the seed end contain less $Li^+$ and generally color more densely than crystals from the other end.

The crystals used were grown in an inert argon atmosphere using the standard Kyropoulos technique. Since the behavior of color centers in KCl is not particularly sensitive to the presence of most trace impurities, the crystal boules were grown with reagent grade salts. Crystals were cleaved with approximate dimensions, $2 \times 8 \times 10$ mm, chosen to conform to the laser cavity. The confocal parameters and matching crystal lengths for the crystal was about 10 mm. The crystals ranged in thickness from 1.5 to 2.8 mm. This range was convenient for edge polishing and still adequately thin for optical penetration of the NUV light.

The crystals were colored by first wrapping them in aluminum foil each with two exposed edges and placed in a cylindrical stainless-steel tube. The tube was approximately ¾ inches in diameter and six inches long. One end was weld sealed and contained a 5-10 gm pellet of potassium metal. The tube was then evacuated, backfilled with argon gas at atmospheric pressure, and welded shut. The bottom end of the tube was kept cool while welding to avoid metal liquification and crystal strain. The tube was then placed in a preheated, cylindrical, single zone oven with the crystal end maintained at about 616° C. or above and the metal end at about 530° C. After coloring for one hour or longer, the tube was quenched to room temperature, cooling first the potassium end, to avoid metal condensation on the crystal surfaces, and seconds later, the crystal end. Rapid cooling was used mainly to minimize colloid formation.

The crystal surfaces were next mechanically ground using 0000-grit emery paper dampened in alcohol and polished using Linde A powder in isopropyl alcohol. Crystals used for lasing were also prepared with polished unwedged parallel edges. Before use, samples were wrapped in aluminum foil, annealed several minutes about 20°-40° C. below the coloration temperature and quenched to room temperature. This removed aggregate centers or residual colloids which may have formed through exposure to room light or long periods of storage at room temperature. Handling under weak red light conditions, the crystals were then given a final high polish and mounted on the cold finger of an optical cryostat using indium foil for thermal contact.

EXPERIMENTAL RESULTS

Measurements were taken using two separate cryostat tail sections, one for spectroscopic measurements and another for laser measurements. All absorption measurements were made with a Cary model 2390 spectrophotometer. Dewar windows used for spectroscopy and for exposure to NUV light were either fused silica or $CaF_2$.

The results of the laser measurements found that the maximum output power was over 1.2 Watts cw. This occurred for lasing at 2.2 microns using 11 Watt incident pump power, a 30% output coupler and approximately 240 mW of NUV auxiliary light. The crystal used was approximately 2.5 mm thick, additively colored for 1.5 hours at 616° C. and processed by exposure to NUV light for 2.5 hours, as the crystal cooled from 285 and 190K. The crystal absorbed 78% of the 1.3 micron pump light measured at low intensities along an 8.3 mm path length.

Figure 3:
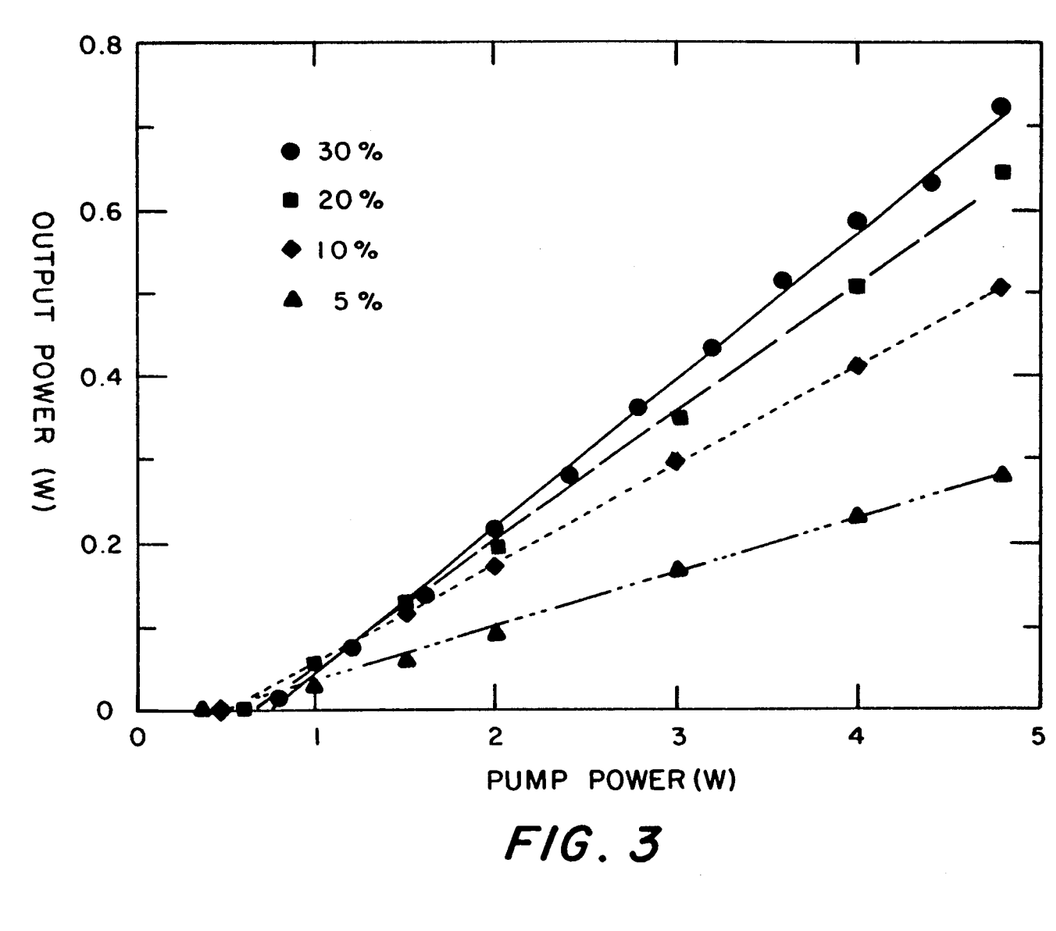
FIG. 3 illustrates a plot of output power versus incident input power for the KCl:Li $(F_2^+)_A$ color center laser of the present application.

FIG. 3 illustrates a plot of output power versus incident input power for the KCl:Li $(F_2^+)_A$ center laser. The plot in FIG. 3 shows that the slope efficiency varies from 17%, for the 30% output coupler, to 7% for the 5% coupler. The threshold for lasing correspondingly decreases from 650 mW to 180 mW. The total estimated cavity losses was 14% due mostly to reflective losses at the crystal edges. The use of Brewster edges would have largely eliminated these losses but introduced astigmatism and coma. In addition, the use of Brewster edges would not have allowed full utilization of the pump operating in its more powerful unpolarized mode.

Figure 4:
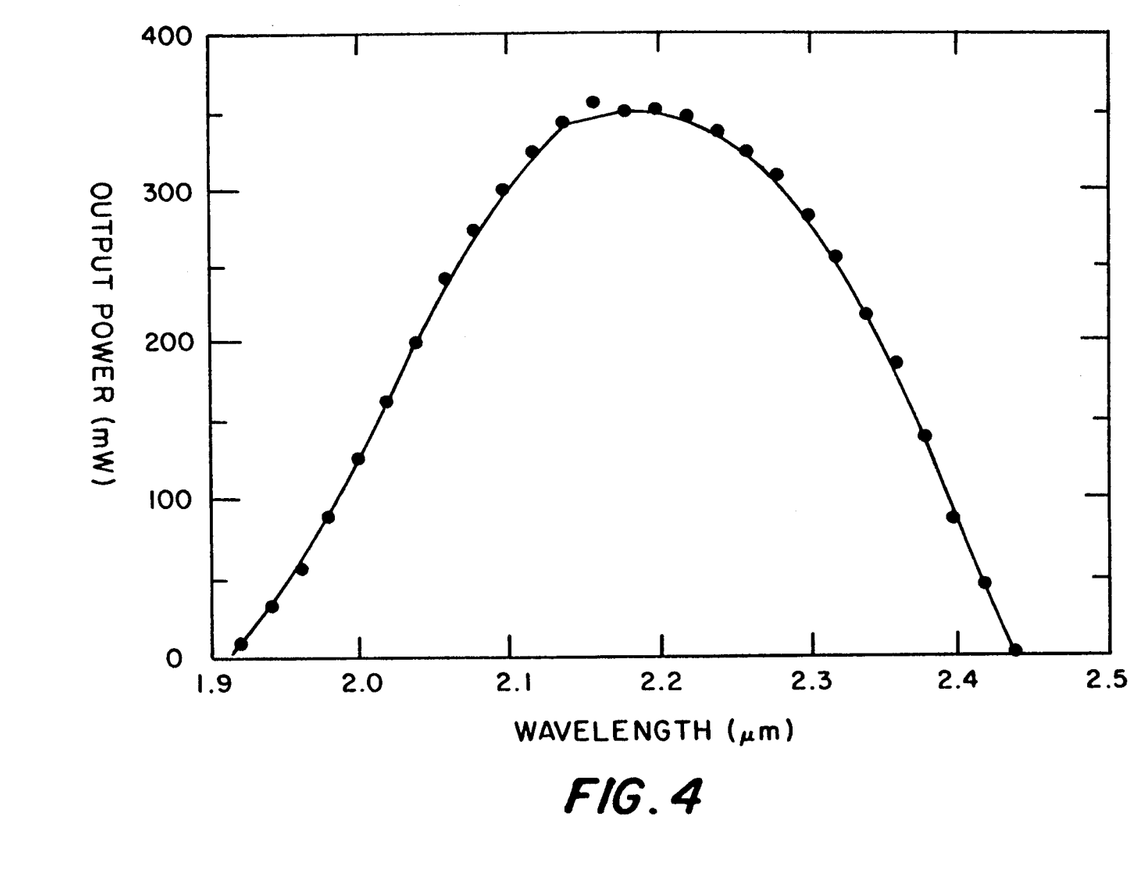
FIG. 4 illustrates a plot of the tuning curve for the $(F_2^+)_A$ color center laser.

FIG. 4 illustrates a plot of the tuning curve for the $(F_2^+)_A$ center laser. FIG. 4 shows that the laser was tunable from 1.9 to 2.4 microns, typical for KCl:Li $(F_2^+)_A$ centers. The color center laser was tuned using the diffraction grating in place of the output coupler 210. The output power was lower using the grating because of its relatively small output coupling and because of the fact that the crystal was now pumped using a single pass of the Nd:YAG longitudinal pump beam 240.

The output powers plotted in FIGS. 3 and 4 are steady state values using full pump intensities and a 50% chopper duty cycle. The instantaneous values were usually highest initially but decreased as the crystal equilibrated above LNT. These thermal effects were particularly severe with the chopper off. The observed decrease in output can be explained by the fact that the NUV light ionizes more F centers at higher temperatures, particularly above 100 K. This would alter the photodynamical process and effectively produce fewer $(F_2^+)_A$ centers. Conversely, powers greater than 1.5 W were obtained near 4K using less NUV light. This improved performance at 4K is due mostly to narrowing of the $F_A^-$ band and correspondingly less absorption of the pump by $F_A^-$ centers.

Figure 5:
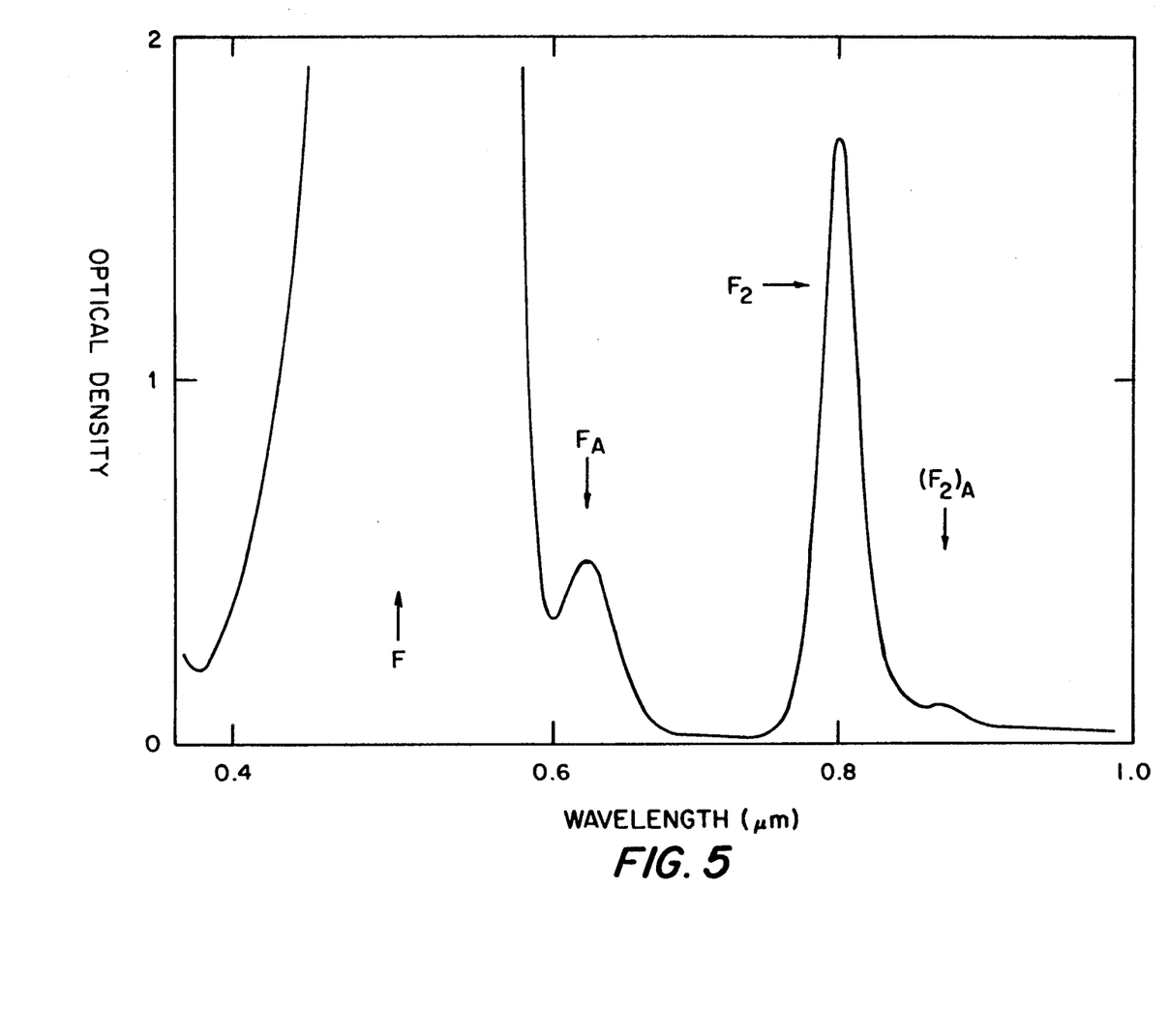
FIG. 5 illustrates a plot of an absorption spectrum measured at liquid nitrogen temperature (LNT), i.e., at 77 K, before processing a KCl:Li crystal.

FIG. 5 illustrates a plot of an absorption spectrum measured before processing for a sample colored along with the crystal used for the above laser measurements. The absorption spectrum was measured at LNT before processing of the 2.5 mm thick KCl:Li crystal. The crystal was additively colored for 1.5 hours at 616° C. The coloration density of a crystal is an important parameter for establishing the suitability of the crystal for lasing. The sample contained F centers, $F_2$ centers and a small number of $F_A$ and $(F_2)_A$ centers. Since the F band peak is too large for spectroscopic measurement, the overall coloration density is gauged using the initial size of the $F_2$ band. Throughout this investigation, it was found that the highest laser outputs were obtained from crystals about 2 mm thick for $F_2$ bands initially between 0.4 to 1.4 optical density (OD) measured at room temperature. At LNT, these absorptions narrow and the corresponding values are about 0.8 to 2.8.

Figure 6A:
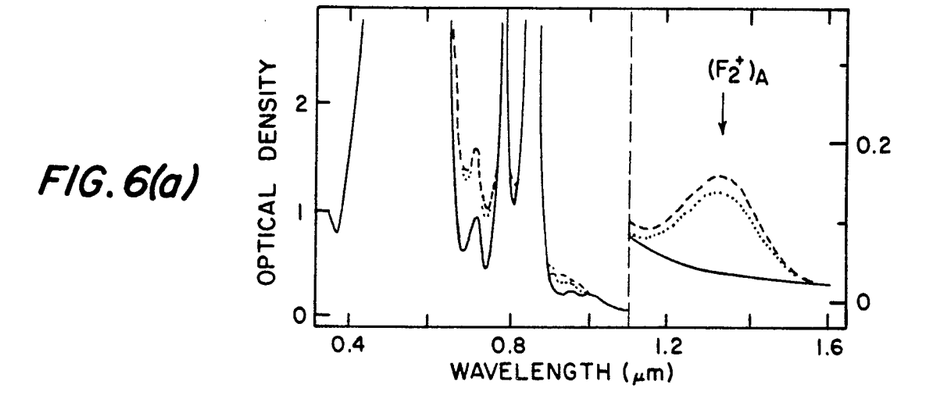
FIGS. 6(a) through 6(c) illustrates the effect of differing processing techniques showing plots of absorption spectra for three different crystals measured at LNT with two optical density scalings after subsequent exposure to NUV light for several seconds.
Figure 6B:
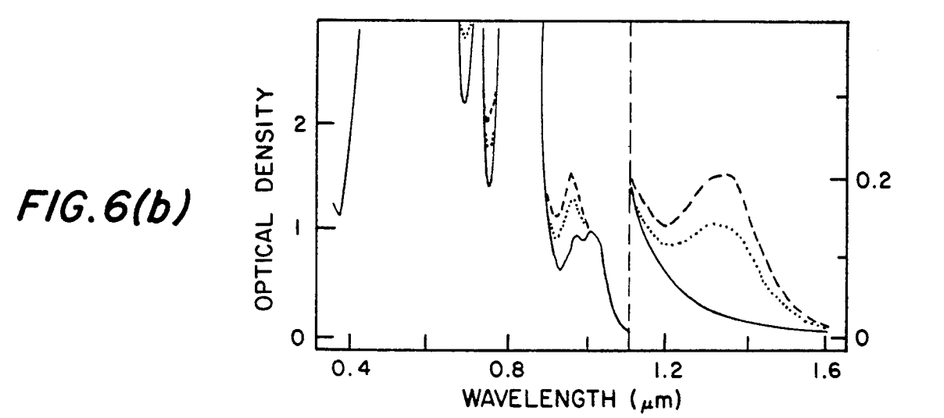
Figure 6C:
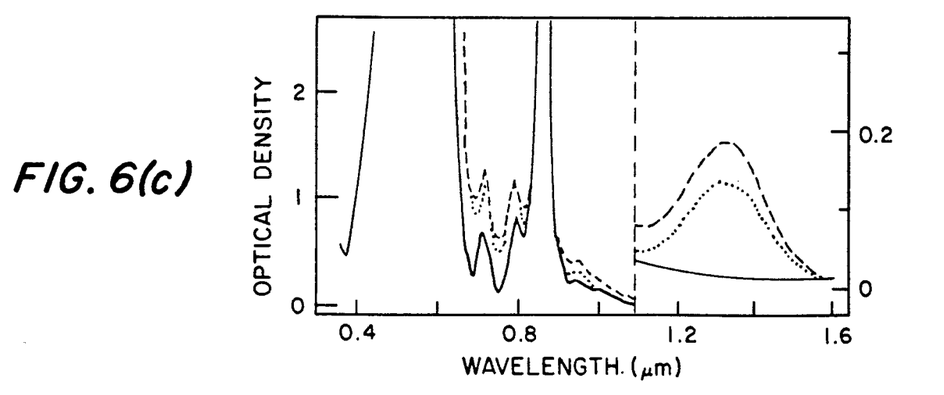

FIGS. 6(a) through 6(c) illustrate plots of absorption spectra for three laser active crystals. FIG. 6(a) shows spectra for the crystal of FIG. 3 processed in a relatively high temperature range just below room temperature. Processing consists of exposure to NUV light for 1.5 hours as the crystal cooled from 285 and 200K. FIG. 6(b) shows spectra for a second crystal processed in the same temperature range as the crystal of FIG. 6(a) but colored more heavily. The crystal was additively colored for 2 hours at 621° C. and processed as the crystal of FIG. 6(a). FIG. 6(c) shows spectra for a third crystal colored as densely as the crystal of FIG. 6(a) but processed in a lower temperature range. The crystal was additively colored with the crystal of FIG. 6(b) but processed at lower temperatures by exposure to NUV light for 4 minutes at 245K and for 2 hours around 190K. These three crystals roughly cover the ranges of coloration density and processing temperature which still lead to reasonably high laser outputs. The absorption spectra shown in FIGS. 6(a) through 6(c) were measured at LNT for crystals about 2.5 mm thick after processing with NUV light. The solid curves plot absorption spectra for crystals after subsequent exposure to red light at LNT to neutralize all charged centers. The dashed curves plot absorption spectra for crystals after subsequent exposure to NUV light at LNT. The dotted curves plot absorption spectra for crystals after exposure to low intensity 1.3 micron laser light for several seconds at LNT.

The measurements illustrated in FIG. 6(a) through 6(c) demonstrate how coloration density and processing temperature affect the number and stability of $(F_2^+)_A$ centers. As mentioned above, processing involves photoaggregation of color centers where F centers convert to $F_A$ and $F_2$ centers while $F_2$ centers convert to $(F_2)_A$ and $F_3$ centers. FIGS. 6(a) through 6(c) show that significantly more aggregate centers are produced in the densely colored crystal (FIG. 6(c)) than either of the other two crystals (FIGS. 6(a) or 6(b)), and that the smallest number of aggregates is produced in the crystal (FIG. 6(c)) processed in the low temperature range (compare the solid curves). More aggregates are produced in denser samples because the color centers are initially closer together. Fewer aggregates form at lower temperatures because the mobile anion vacancies diffuse shorter distances. These spectra also show that the NUV absorption is proportionately larger in crystals with more aggregate centers. That would be expected since absorption in the NUV region is due mostly to higher excited states of the aggregate centers. The conversion of $F_2$ centers to $(F_2)_A$ centers also seems to occur more rapidly in crystals processed at lower temperatures.

The NUV light exposure at LNT results in the formation of an absorption peaking at 1.35 microns, due mostly to $(F_2^+)_A$ centers, and an overall absorption increase in the region between the $(F_2^+)_A$ and F bands, due mostly to $F_A^-$ centers (see the dashed curves of FIG. 6(a)-6(c)). These absorption changes result from the photodynamic state produced by the optically induced transfer of electrons from $(F_2^+)_A$ centers to mostly $F_A$ centers. FIGS. 6(a) through 6(c) show that the $(F_2^+)_A$ band is largest, and of about equal size, in the densely colored crystal than the crystal processed at the lower temperatures (compare the dashed curves). This may seem surprising since one crystal contains the most aggregates and the other contains the least aggregates. However, the more densely colored sample (FIG. 6(b)) contains many more $F_3$ centers which also absorb the NUV light and ionize. The $(F_2^+)_A$ band would therefore be smaller because of this additional electron transfer process.

The bleaching of $(F_2^+)_A$ centers with 1.3 micron light has been shown to occur in two stages. The first stage is rapid, in seconds, and due to the liberation of electrons mostly from $F^-$ centers. The second stage is slower, in minutes, and due to the liberation of electrons from $F_A^-$ centers. Under the high pump intensities used in laser operation, only the slow "stable" component due to $F_A$ trapping can be sustained with an NUV light auxiliary source. Regarding the 1.3 micron bleaching, FIGS. 6(a), 6(b) and 6(c) show that the number of "stable" $(F_2^+)_A$ centers is about the same in all three samples (compare the dotted curves). The crystal of FIG. 6(a) initially had the fewest $(F_2^+)_A$ centers but also bleached the least, about 15%.

The concentration of "stable" $(F_2^+)_A$ centers could be influenced by a variety of factors. The most significant of these is that the $F_A$ concentration is limited by the limited $Li^+$ concentration. In the more densely colored crystal, the $F_3$ center and F center concentrations are relatively large and therefore these centers play a more significant role for trapping electrons. In crystals processed at lower temperatures, fewer $F_2$ centers are produced so that F centers play the more significant role. For the examples illustrated in FIGS. 6(a), 6(b) and 6(c), since the concentration of "stable" $(F_2^+)_A$ centers is about the same in all three cases, all should lase equally well. In fact, the more heavily-colored sample of FIG. 6(b) produced 20–30% less laser output than the crystal of FIG. 6(a). This can be attributed to its relatively large NUV absorption which hampers penetration of the NUV auxiliary light into the crystal. A crystal similar to that of FIG. 6(c) with slightly fewer $(F_2^+)_A$ centers produced about the same power as that of FIG. 6(a) while requiring less NUV intensity. This performance likely stems from the fact that the crystal has the smallest NUV absorption.

The examples chosen for illustration in FIGS. 6(a), 6(b) and 6(c) indicate that the number of "stable" $(F_2^+)_A$ centers produced is largely insensitive to coloration density and processing temperature within the ranges used. These crystals all lased reasonably well with minor differences attributable to factors such as NUV absorption. Beyond these ranges, fewer $(F_2^+)_A$ centers were found to be produced in more lightly-colored crystals while more densely colored samples contained both many more $F_3$ centers, and very large NUV light absorptions. Beyond these ranges, processing at lower temperatures was found to produce fewer $F_A$ and $F_2$ centers since anion vacancies are much less mobile, whereas processing at higher temperatures (room temperature or above) was found to produce many more $F_3$ centers and colloids. All the above deviations resulted in decreased laser performance.

While the invention has been illustrated and described in detail in the drawings and foregoing description, it will be recognized that many changes and modifications will occur to those skilled in the art. KCl:Li is the most widely-investigated alkali halide and similar centers in other alkali halides could be used. Applying the results to a doubly-doped KCl:Li, Na system should lead to a powerful laser with almost double the tuning range (1.6 to 2.4 microns). KBr:Li and KI:Li might also be utilized to extend tuning out towards 4 microns. It can also be appreciated that higher NUV intensities, optimized output coupling, better heat sinking and a more complete conversion of $F_2$ centers to $(F_2)_A$ centers can yield improvements. It is therefore intended, by the appended claims, to cover any such changes and modifications as fall within the true spirit and scope of the invention.

What is claimed is:

1. A color center laser comprising:
   first and second reflective elements arranged to define a resonant cavity having an optical axis;
   a color center material having a length L and being disposed along the optical axis in said resonant cavity;
   a near uv radiation source, having a preselected wavelength, providing an auxiliary beam absorbed by said color center material to produce a population of $(F_2^+)_A$ color centers;
   optical means for focusing all of the auxiliary beam into said color center material to a focal line of a length essentially equal to the length of said color center material to sustain said a population of $(F_2^+)_A$ centers in the color center material; and
   pumping means for longitudinally pumping said population of absorbed color centers material to cause said $(F_2^+)_A$ color centers to transmit a laser emission through said second reflecting element.

2. A color center laser according to claim 1, wherein said optical means includes a circular lens disposed between said near uv radiation source and said color center material for focusing the auxiliary beam to approximate the length of said color center material.

3. A color center laser according to claim 2, wherein said optical means further includes a cylindrical lens disposed between said circular lens and said color center material for focusing the auxiliary beam into a line along the optical axis to coincide with said color center material.

4. A color center laser according to claim 3, wherein the length of said color center material is essentially equal to a distance between locations where an active volume of the cavity has a beam with a width W, a narrowest center portion of the beam having a width $W/\sqrt{2}$.

5. A color center laser according to claim 3, wherein said optical means further includes means for directing the auxiliary beam into said color center material in a direction orthogonal to the optical axis.

6. A color center laser according to claim 1, wherein the length of said color center material is essentially equal to a distance between locations where an active volume of the cavity has a beam with a width W, a narrowest center portion of the beam having a width $W/\sqrt{2}$.

7. A color center laser according to claim 1, wherein said color center material comprises an alkali halide crystal doped with alkali ion impurities.

8. A color center laser according to claim 7, wherein said alkali halide crystal comprises potassium chloride doped with lithium impurities.

9. A color center laser according to claim 1, wherein said near uv radiation source emits said auxiliary beam at a wavelength sufficient to cause formation of $(F_2^+)_A$ color centers in said color center material.

10. A color center laser according to claim 1, wherein said first and second reflective elements respectively include input and output couplers.

11. A color center laser according to claim 10, wherein said input and output couplers respectively include input and output mirrors.

12. A color center laser comprising:

first and second reflective elements arranged to define a resonant cavity having an optical axis;

a color center material disposed along the optical axis in said cavity and having a length;

a near uv radiation source, having a preselected wavelength, providing an auxiliary beam absorbed by said color center material to produce a population of $(F_2^+)_A$ color centers;

a circular lens disposed along the auxiliary beam between said color center material and said near uv radiation source for focusing the auxiliary beam to approximate the length of said color center material;

a cylindrical lens disposed along the auxiliary beam between said color center material and said circular lens for focusing the auxiliary beam into a line along the optical axis to coincide with the length of said color center material; and a pumping source for providing a longitudinal pumping beam along the optical axis of the cavity to pump said $(F_2^+)_A$ color center material in the laser.

13. A color center laser according to claim 12, wherein said circular lens and said cylindrical lens are configured between said near uv radiation source and said color center material to direct the auxiliary beam into said color center material in a direction orthogonal to the optical axis to enable the auxiliary beam to form and sustain a population of $(F_2^+)_A$ centers in an active portion of the color center material.

14. A color center laser according to claim 12, wherein the length of said color center material is essentially equal to a distance between locations where an active volume of the cavity has a beam with a width W, a narrowest center portion of the beam having a width $W/\sqrt{2}$.

15. A color center laser according to claim 14, wherein said illumination source emits said auxiliary beam at a wavelength sufficient to cause formation of $(F_2^+)_A$ color centers in said color center material.

16. A color center laser according to claim 12, wherein said material includes an alkali halide crystal doped with alkali ion impurities.

17. A color center laser according to claim 16, wherein said alkali halide crystal includes potassium chloride doped with lithium impurities.

18. A color center laser according to claim 12, further comprising a collimating lens configured within the cavity along the optical axis between said color center material and one of said first and second reflective elements.

* * * * *